T. E. McDONALD.
Wringer.

No. 162,935.

Patented May 4, 1875.

Attest:
J. Mason Cozler
William T. Jones

Inventor:
Thomas E. McDonald
By N. Crawford
Att'y.

UNITED STATES PATENT OFFICE.

THOMAS E. McDONALD, OF NEW BRUNSWICK, NEW JERSEY.

IMPROVEMENT IN WRINGERS.

Specification forming part of Letters Patent No. 162,935, dated May 4, 1875; application filed April 8, 1875.

*To all whom it may concern:*

Be it known that I, THOMAS E. McDONALD, of New Brunswick, in the county of Middlesex, in the State of New Jersey, have made certain Improvements in Clothes-Wringers, of which the following is a specification:

This invention relates to the construction of clothes-wringers, whereby the rubber surfaces that squeeze the water out of the clothes in passing between such rubber surfaces are not fast to the shafts that cause their rotation. It also relates to the placing of such rubber surfaces and their shafts into posts, that one shaft and its rubber will work in rigid bearings, and the other shaft with its rubber surface will work in yielding bearings, which can be adjusted nearer to or farther from the rigid shaft, as may be desired; and it consists in the construction and arrangement of the actuating parts, as will be hereinafter fully described.

Figure 1:
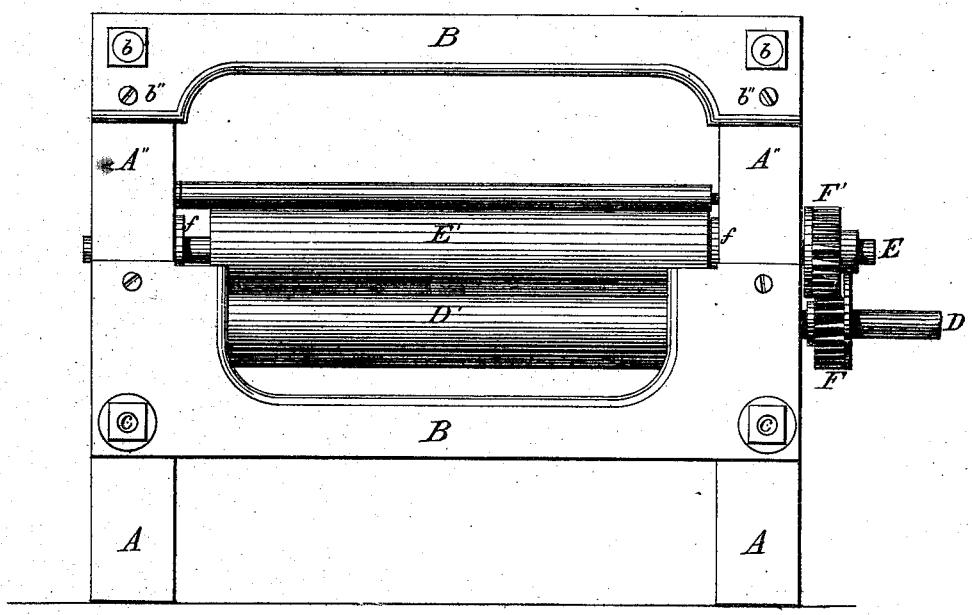
Figure 2:
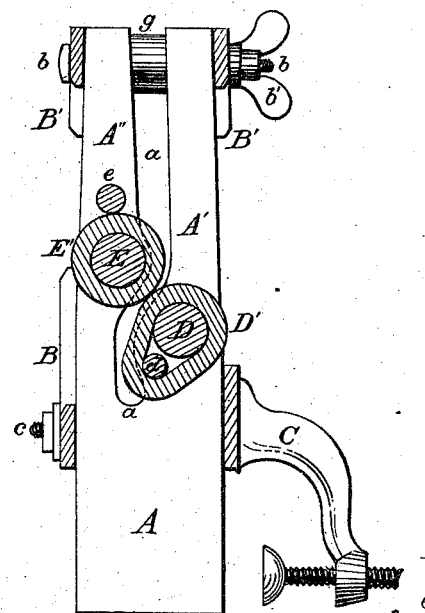

In the drawings, Figure 1 is a side view of the wringer, and Fig. 2 is a transverse sectional view.

A represents the upright body or end supports for the shafts and wringer-tubes, and may be in one piece, as shown, or in two parts and bolted firmly together below the space $a$ between them, to form the two parts that make the bearings for the shafts. $A'$ $A'$ are the upper parts of A, and are to be rigid or non-yielding, and in which the shaft D has its bearings, that carries and revolves the yielding wringer-tube $D'$, that is loose, over or around said shaft D. $A'$ $A'$ also contain the bearings in which small shaft $d$ revolves, that keeps the rubber tube in proper tension to prevent wrinkling or displacing the rubber tube while in operation. $A''$ $A''$ are the yielding upper parts of A, and have the bearings for shaft E, that carry and revolve the rubber tube $E'$ and shaft $e$, that bears upon the outside of the rubber tube $E'$, and prevent the tube from getting misplaced on shaft E while in operation. Parts $A''$ are made yielding with relation to $A'$ by curving the space or opening $a$, to be much nearer to the outside of $A''$ at its bottom or lowest part. B B are the lower longitudinal girts that hold the end supports A at the proper distance apart at their lower ends by the screw-bolts $c$ on clamp C, passing through them and the supports A. $B'$ $B'$ are the upper longitudinal girts on each outside of parts $A'$ and $A''$ at their upper ends, and are held to the parts $A'$ and $A''$ by the screws $b''$ and screw-bolts $b$, that pass through girts $B'$, and parts $A'$ and $A''$ near their upper ends. $g$ is a spring of rubber or other material, to force the upper ends of $A'$ and $A''$ from each other, but to be flexible or yielding, so that as nut $b'$, on screw-bolt $b$ is turned up it will cause the upper ends of parts $A'$ and $A''$ to compress the spring $g$, and force them nearer together—hence will cause the rubber wringer-tube $E'$ to be forced against the lower tube $D'$, and give a harder squeeze upon the clothes that pass between them, and by turning screw-bolt $b'$ back, spring $g$ will cause the top of $A'$ and $A''$ to separate farther from each other, and widen the space between the wringer-tubes $D'$ and $E'$. F is a gear-wheel upon the driving-shaft D, and gears into wheel $F'$ on shaft E, and by turning the shaft D, gear-wheels F and $F'$ cause the two rubber tubes $D'$ and $E'$ to revolve, and as rubber tube $D'$ revolves, it of course causes the small shaft $d$ to also revolve, which, as it revolves, keeps the tube in place on shaft D, and prevents wrinkling or displacement, while shaft $e$, that is over tube $E'$, also prevents any displacement of tube $E'$ on shaft E by the clothes that pass between the two rubber tubes $D'$ and $E'$.

By this construction it will be seen that the rubber surfaces that press the water from the passing clothes are not permanently fixed or fast to their shafts, but are free from them, and are only moved by them, which obviates what has heretofore been a serious trouble—the getting the rubber so that it will not, under any circumstances, get loose from its shaft. The inside of the rubber tubes $D'$ and $E'$ may be lined with strong duck or canvas, to protect the rubber from wear by the revolution of the shaft.

Having thus described my invention, what I claim is—

1. In a clothes-wringer, the combination of the rubber tube $D'$, shafts D and $d$ in a rigid support, A′, and rubber tube E′, shafts E and e in a yielding support, A″, substantially as and for the purposes described.

2. The combination of the spring $g$, screw-bolt $b$, and screw-nut $b'$, yielding support A″, and rubber tube E′, and its shafts E and $e$, with the rigid support A′, and rubber tube D, and its shafts D and $d$, substantially as and for the purposes described.

THOMAS E. McDONALD.

Witnesses:
R. McDONALD,
JAMES H. VANCLEEF.